(12) United States Patent
Sassaman et al.

(10) Patent No.: US 12,338,151 B2
(45) Date of Patent: Jun. 24, 2025

(54) TREATMENT OF AZOLES

(71) Applicant: Evoqua Water Technologies LLC, Pittsburgh, PA (US)

(72) Inventors: Frank L. Sassaman, Fombell, PA (US); Alan Knapp, Lake Oswego, OR (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 413 days.

(21) Appl. No.: 17/638,853

(22) PCT Filed: Aug. 26, 2020

(86) PCT No.: PCT/US2020/047870
§ 371 (c)(1),
(2) Date: Feb. 28, 2022

(87) PCT Pub. No.: WO2021/041459
PCT Pub. Date: Mar. 4, 2021

(65) Prior Publication Data
US 2022/0298045 A1   Sep. 22, 2022

Related U.S. Application Data

(60) Provisional application No. 62/891,580, filed on Aug. 26, 2019.

(51) Int. Cl.
*C02F 9/00* (2023.01)
*C02F 1/32* (2023.01)
(Continued)

(52) U.S. Cl.
CPC .............. *C02F 9/00* (2013.01); *C02F 1/32* (2013.01); *C02F 1/42* (2013.01); *C02F 1/444* (2013.01);
(Continued)

(58) Field of Classification Search
CPC ...... C02F 9/00; C02F 1/32; C02F 1/42; C02F 1/444; C02F 1/66; C02F 1/722;
(Continued)

(56) References Cited

U.S. PATENT DOCUMENTS 6,991,735 B2    1/2006  Martin
7,438,804 B2 *  10/2008 Umezawa ................. C02F 1/72
                                                 204/660

(Continued)

FOREIGN PATENT DOCUMENTS

WO      2015188044 A1    12/2015

OTHER PUBLICATIONS

International Search Report in corresponding PCT/US2020/047870, dated Jan. 12, 2021.
(Continued)

*Primary Examiner* — Madeline Gonzalez (57) ABSTRACT

Methods of treating CMP wastewater comprising azoles are disclosed. The method includes providing the wastewater having a first azole concentration, introducing the wastewater to an inlet of a wastewater treatment system constructed and arranged to produce and introduce free radicals into the wastewater, and activating the wastewater treatment system to produce and introduce the free radicals into the wastewater in an amount sufficient to reduce the azole concentration in the wastewater and produce treated water having a second azole concentration, less than the first azole concentration. Methods of facilitating treatment of CMP wastewater comprising azoles by providing a water treatment system constructed and arranged to produce and introduce free radicals into the wastewater are disclosed.

27 Claims, 1 Drawing Sheet

(51) Int. Cl.
*C02F 1/42* (2023.01)
*C02F 1/44* (2023.01)
*C02F 1/66* (2023.01)
*C02F 1/72* (2023.01)
*C02F 101/38* (2006.01)
*C02F 103/34* (2006.01)

(52) U.S. Cl.
CPC ............... *C02F 1/66* (2013.01); *C02F 1/722* (2013.01); *C02F 2101/38* (2013.01); *C02F 2103/346* (2013.01); *C02F 2209/20* (2013.01); *C02F 2305/023* (2013.01)

(58) Field of Classification Search
CPC ............ C02F 2101/38; C02F 2103/346; C02F 2209/20; C02F 2305/023; C02F 2209/001; C02F 1/5245; C02F 2209/003; C02F 2305/10; C02F 1/58
USPC ....... 210/638, 639, 650, 651, 660, 663, 665, 210/667, 669, 673, 681, 734, 735, 759, 210/748.1, 748.15
See application file for complete search history.

(56) References Cited

U.S. PATENT DOCUMENTS

| | | | |
|---|---|---|---|
| 8,652,336 | B2 | 2/2014 | Sitkiewitz et al. |
| 8,801,937 | B2* | 8/2014 | Yasuike ............... C02F 1/5245 |
| | | | 210/729 |
| 8,961,798 | B2 | 2/2015 | Coulter |
| 2004/0108277 | A1 | 6/2004 | Krulik |
| 2005/0274678 | A1 | 12/2005 | Chen et al. |
| 2018/0273412 | A1* | 9/2018 | Hall ......................... C02F 9/00 |

OTHER PUBLICATIONS

Wiebe, Hannah, "Requisition by The Examiner", Canadian Patent Application No. 3146339, mailed Jan. 20, 2025.
Kin et al., "Treatment of Chemical-Mechanical Planarization Wastes by Electroagulation/Electro-Fenton Method", IEEE Transactions on Semiconductor Manufacturing, vol. 19, No. 2, pp. 208-215, DOI: 10.1109/TSM.2006.873511, May 1, 2006 (May 1, 2006).
Unknown, "Decision to Refuse", Japanese Patent Application No. 2022-506530, mailed Oct. 22, 2025.
Janssens, Christophe, "Communication pursuant to Article 94(3) EPC", European Patent Application No. 20858834.3, mailed Feb. 24, 2025.

* cited by examiner

TREATMENT OF AZOLES

CROSS-REFERENCE TO RELATED APPLICATIONS

This application claims priority under 35 U.S.C. § 119(e) to U.S. Provisional Patent Application Ser. No. 62/891,580 titled "Treatment of Azoles" filed Aug. 26, 2019, the entire disclosure of which is hereby incorporated herein by reference in its entirety for all purposes.

FIELD OF TECHNOLOGY

Aspects and embodiments disclosed herein relate to systems and methods of reducing concentrations of azoles in wastewater.

SUMMARY

In accordance with one aspect, there is provided a method of treating chemical-mechanical polishing (CMP) wastewater comprising azoles. The method may comprise providing the wastewater having a first azole concentration. The method may further comprise introducing the wastewater to an inlet of a wastewater treatment system. The wastewater treatment system may be constructed and arranged to produce and introduce free radicals into the wastewater. The method may additionally comprise activating the wastewater treatment system to produce and introduce the free radicals into the wastewater in an amount sufficient to reduce the azole concentration in the wastewater and produce treated water having a second azole concentration, less than the first azole concentration.

In some embodiments, the first azole concentration may be from about 20 mg/L to about 200 mg/L. For example, the first azole concentration may be from about 20 mg/L to about 60 mg/L, about 30 mg/L to about 80 mg/L, about 40 mg/L to about 100 mg/L, about 50 mg/L to about 120 mg/L, about 60 mg/L to about 150 mg/L, about 70 mg/L to about 160 mg, about 80 mg/L to about 180 mg/L, or about 100 mg/L to about 200 mg/L. In certain embodiments, the first azole concentration may be from about 40 mg/L to about 150 mg/L. In further embodiments, the first azole concentration may be from about 80 mg/L to about 100 mg/L.

In some embodiments, the second azole concentration may be less than about 10 mg/L.

In some embodiments, the azole concentration in the treated water, that is, less than about 10 mg/L, is sufficient for the operation of at least one downstream water treatment process.

In some embodiments, providing the wastewater comprises providing wastewater having a mixture of azoles. For example, the azoles comprising the mixture of azoles may be selected from the group consisting of imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, benzotriazole, o-tolyltriazole, m-tolyltriazole, p-tolyltriazole, 5-ethylbenzotriazole, 5-n-propylbenzotriazole, 5-isobutylbenzotriazole, and 4-methylbenzotriazole, and combinations thereof. In certain embodiments, the azoles comprising the mixture of azoles may be selected from the group consisting of imidazole, pyrazole, oxazole, 2,3-triazole, 1,2,4-triazole, 1,2,5-oxadiazole, benzotriazole, o-tolyltiazole, m-tolyltriazole, p-tolyltriazole, and 5-ethylbenzotriazole. In particular embodiments, the wastewater having the mixture of azoles may include at least 1,2,4-triazole, but is not limited thereto.

In further embodiments, the method may include treating at least one of the wastewater and treated water using an ion exchange treatment system.

In further embodiments, the method may comprise measuring at least one of the azole and total organic carbon (TOC) concentration in the wastewater prior to introducing the wastewater to the inlet of the wastewater treatment system.

In some embodiments, introducing the wastewater to the inlet of the wastewater treatment system may comprise introducing the wastewater to an inlet of a wastewater treatment system selected from at least one of an advanced oxidation process (AOP) and a dissolved iron treatment process. For an AOP, introducing the wastewater to the inlet of the AOP may introducing the wastewater to the inlet of an ultraviolet (UV)-AOP. In further embodiments, the method may comprise treating the wastewater with a filtration system prior to introduction into the UV-AOP.

In some embodiments, introducing the wastewater to the inlet of the ultraviolet (UV)-AOP may comprise introducing the wastewater to the inlet of a UV-persulfate AOP. For example, introducing the wastewater to the inlet of the UV-persulfate AOP may comprise introducing persulfate ions to the wastewater based on at least the azole concentration in the wastewater. In some embodiments, activating the UV-persulfate AOP comprises exposing the persulfate ions in the wastewater to UV light to produce persulfate radicals.

In some embodiments, introducing the wastewater to the inlet of the ultraviolet (UV)-AOP comprises introducing the wastewater to the inlet of a UV-peroxide AOP. For example, introducing the wastewater to the inlet of the UV-peroxide AOP may comprise introducing a peroxide to the wastewater based on at least the azole concentration in the wastewater. In some embodiments, activating the UV-peroxide AOP comprises exposing the persulfate ions in the wastewater to UV light to produce hydroxyl or hydroperoxyl radicals.

In some embodiments, introducing the wastewater to the inlet of the wastewater treatment system may comprise introducing the wastewater to the inlet of a dissolved iron treatment process. For a dissolved iron process, the method may further comprise reducing the pH of the wastewater prior to introducing the wastewater to the dissolved iron treatment process. In some embodiments, introducing the wastewater to an inlet of a dissolved iron treatment process comprises introducing a dissolved iron compound and an oxidizer to the wastewater at an acidic pH. The oxidizer may be persulfate ions from a persulfate salt or a peroxide, such as hydrogen peroxide, with persulfate ions producing persulfate radicals and peroxide molecules producing hydroxyl and/or hydroperoxyl radicals. In further embodiments, the method may include precipitating iron-containing compounds from the wastewater by increasing the pH of the wastewater to produce the treated water.

In further embodiments, the method may comprise measuring at least one of the azole concentration and the TOC concentration in the treated water. The measured TOC concentration may be correlated with the measured second azole concentration in the treated water, that is, the second azole concentration and TOC concentration may be linearly dependent.

In further embodiments, the method may comprise introducing the treated water to the downstream treatment process. The downstream treatment process may include a biological treatment process but is not limited thereto.

In further embodiments, the method may comprise discharging the treated water without further treatment.

In accordance with an aspect, there is provided a method of facilitating treatment of CMP wastewater comprising azoles. The method may comprise providing a wastewater treatment system having a connection to a source of wastewater having first azole concentration. The wastewater treatment system may be a wastewater treatment system as described herein that is constructed and arranged to produce and introduce free radicals into the wastewater. The method may comprise providing a controller configured to regulate at least the introduction of wastewater into the treatment system and the production of free radicals responsive to at least the concentration of azoles in the wastewater to produce a treated water having a second azole concentration, the second azole concentration less than the first azole concentration.

In some embodiments, the first azole concentration may be from about 20 mg/L to about 200 mg/L. For example, the first azole concentration may be from about 20 mg/L to about 60 mg/L, about 30 mg/L to about 80 mg/L, about 40 mg/L to about 100 mg/L, about 50 mg/L to about 120 mg/L, about 60 mg/L to about 150 mg/L, about 70 mg/L to about 160 mg, about 80 mg/L to about 180 mg/L, or about 100 mg/L to about 200 mg/L. In certain embodiments, the first azole concentration may be from about 40 mg/L to about 150 mg/L. In further embodiments, the first azole concentration may be from about 80 mg/L to about 100 mg/L.

In some embodiments, the second azole concentration may be less than about 10 mg/L.

In further embodiments, the method may comprise providing at least one additional treatment system for the wastewater. For example, the additional treatment system may include at least one of an ion exchange system and a filtration system.

In further embodiments, the method may include providing a first azole concentration sensor constructed and arranged to measure the first azole concentration prior to introduction into the treatment system. In further embodiments, the method may include providing a first TOC concentration sensor constructed and arranged to measure a TOC concentration prior to introduction into the treatment system. In further embodiments, the method may include providing a flow meter constructed and arranged to measure the flow of wastewater into the wastewater treatment system.

In some embodiments, providing the wastewater treatment system may comprise providing at least one of an AOP and a dissolved iron treatment process. For example, providing the AOP may include providing a UV-persulfate AOP. In some embodiments, providing a UV-persulfate may further include providing the persulfate. In further embodiments, providing the AOP may include providing a UV-peroxide AOP. In some embodiments, providing a UV-peroxide may further include providing the peroxide.

In further embodiments, providing the dissolved iron treatment process may comprise providing at least one of a soluble iron compound, an oxidizer, and a pH adjuster. In particular embodiments, providing the dissolved iron treatment process may comprise providing at least one of a soluble iron compound, a persulfate, and a pH adjuster. In other embodiments, providing the dissolved iron treatment process may comprise providing at least one of a soluble iron compound, a peroxide, and a pH adjuster.

In further embodiments, the method may include providing a second azole concentration sensor constructed and arranged to measure the second azole concentration of the treated water. In further embodiments, the method may include providing a second TOC concentration sensor constructed and arranged to measure the TOC concentration of the treated water.

In some embodiments, the azole concentration in the treated water, that is, less than about 10 mg/L, may be sufficient for the operation of at least one downstream water treatment process. In further embodiments, the method may comprise providing the downstream water treatment process. Providing the downstream treatment system for the treated water may comprise providing a biological treatment process but is not limited thereto.

In further embodiments, the method may comprise instructing a user to connect the wastewater treatment system to the source of wastewater. In further embodiments, the method may comprise instructing the user to activate the wastewater treatment system to produce and introduce the free radicals into the wastewater in an amount sufficient to reduce the azole concentration in the wastewater and produce the treated water.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Methods for the treatment of chemical-mechanical polishing (CMP) wastewater including azoles are disclosed herein. The methods disclosed herein provide for the removal of concentrated azole compounds from wastewater generated during semiconductor facility operations.

The CMP planarization process involves a polishing comprising an oxidant, and abrasive, complexing agents, and additional additives to remove and/or etch semiconducting wafers during the manufacturing process. The polishing is used with a polishing pad to remove excess copper from the wafer. Silicon, copper, and various trace metals are removed from the silicon structure via the polishing slurry. The polishing slurry is introduced to the silicon wafer on a planarization table in conjunction with polishing pads. Oxidizing agents and etching solutions are introduced to control the removal of material. Ultrapure water (UPW) rinses are generally employed to remove debris from the silicon wafer. UPW from reverse osmosis (RO), demineralized, and polished water may also be used in the semiconductor fabrication facility tools to rinse the silicon wafer.

In some instances, the wastewater from semiconductor fabrication plants or other industrial sources may include high levels of azoles, for example, from about 20 mg/L up to about 200 mg/L total azoles or greater, that are used as anticorrosive agents during the wafer planarization and polishing process. The wastewater from these processes may also include heavy metals, additional organic compounds, for example, alcohols, and/or surfactants such as ammonium salts, and inorganic abrasives, such as colloidal silica, all of which should be removed prior to discharge of the wastewater. These additional contaminants may be present at levels from about 0.01 wt % up to about 1 wt %. The wastewater may further have a high background total organic carbon (TOC) concentration, with the total azoles comprising a portion of the TOC. For example, oxidizers such as hydrogen peroxide ($H_2O_2$) are generally used to assist in dissolving copper from microchips and may be present in CMP wastewater at concentrations exceeding 1,000 mg/L or 0.1 wt %.

Azoles are not currently regulated for maximum contaminant levels (MCL) by regulatory authorities in the United States but are believed to have a negative impact on the environment upon discharge into open waterways. Recent evidence has indicated bioaccumulation of azoles in fish and incidences of toxicity of naturally occurring algae blooms, necessitating their removal from process water before discharge.

As described in U.S. Pat. No. 8,801,937, the disclosure of which is herein incorporated by reference in their entirety for all purposes, azole compounds are widely used in the semiconductor industry as anticorrosive agents for copper during silicon wafer processing. Examples of such azole compounds include, but are not limited to, imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, any derivatives thereof, amine salts thereof, and metal salts thereof. Examples of azole derivatives include compounds having a fused ring of an azole ring and a benzene ring or the like, such as indazole, benzimidazole, benzotriazole, and benzothiazole, and further include derivatives thereof, such as alkylbenzotriazoles (e.g., benzotriazole, o-tolyltriazole, m-tolyltriazole, p-tolyltriazole, 5-ethylbenzotriazole, 5-n-propylbenzotriazole, 5-isobutylbenzotriazole, and 4-methylbenzotriazole), alkoxybenzotriazoles (e.g., 5-methoxybenzotriazole), alkylaminobenzotriazoles, alkylaminosulfonylbenzotriazoles, mercaptobenzotriazoles, hydroxybenzotriazoles, nitrobenzotriazoles (e.g., 4-nitrobenzotriazole), halobenzotriazoles (e.g., 5-chlorobenzotriazole), hydroxyalkylbenzotriazoles, hydrobenzotriazoles, aminobenzotriazoles, (substituted aminomethyl)-tolyltriazole, carboxybenzotriazole, N-alkylbenzotriazoles, bisbenzotriazole, naphthotriazole, mercaptobenzothiazoles, aminobenzothiazole, amine salts thereof, and metal salts thereof. However, azoles have high chemical stability and are thus difficult to remove from solution and further not easily biodegraded. In conventional wastewater treatments for azole-containing anticorrosive agents, the azole compounds are decomposed using an oxidizing agent having a high oxidizing power, such as ozone ($O_3$), ultraviolet (UV) light, hydrogen peroxide, or an advanced oxidation process where these oxidants are combined to treat collected wastewater. The conventional processes for azole removal have several drawbacks due to the high chemical stability of the azole compounds. For example, for any of the conventional methods described above, large amounts of chemicals are required for the decomposition reactions, thus increasing the costs of treatment. This, in conjunction with the increase in the degree of integration of modern semiconductor devices, has increased the number of fine polishing steps that are carried out per wafer or microchip, thus increasing the volume of CMP wastewater produced requiring treatment.

In accordance with one or more embodiments, there is provided a method of treating CMP wastewater comprising azoles. The method of treating CMP wastewater may include providing the wastewater having a first azole concentration The method may further include introducing the wastewater to an inlet of a wastewater treatment system, the wastewater treatment system constructed and arranged to produce and introduce free radicals into the wastewater. The method may additionally include activating the wastewater treatment system to produce and introduce the free radicals into the wastewater in an amount sufficient to reduce the azole concentration in the wastewater and produce treated water having a second azole concentration, the second azole concentration less than the first azole concentration.

In some embodiments, the first azole concentration may be from about 20 mg/L to about 200 mg/L. For example, the first azole concentration may be from about 20 mg/L to about 60 mg/L, about 30 mg/L to about 80 mg/L, about 40 mg/L to about 100 mg/L, about 50 mg/L to about 120 mg/L, about 60 mg/L to about 150 mg/L, about 70 mg/L to about 160 mg, about 80 mg/L to about 180 mg/L, or about 100 mg/L to about 200 mg/L. In certain embodiments, the first azole concentration may be from about 40 mg/L to about 150 mg/L. In further embodiments, the first azole concentration may be from about 80 mg/L to about 100 mg/L.

In some embodiments, the first azole concentration may be about 20 mg/L, about 30 mg/L, about 40 mg/L, about 50 mg/L, about 60 mg/L, about 70 mg/L, about 80 mg/L, about 90 mg/L, about 100 mg/L, about 110 mg/L, about 120 mg/L, about 130 mg/L, about 140 mg/L, about 150 mg/L, about 160 mg/L, about 170 mg/L, about 180 mg/L, about 190 mg/L, or about 200 mg/L. In certain embodiments, the first azole concentration may be in excess of 200 mg/L, such as greater than about 225 mg/L, about 250 mg/L, or about 300 mg/L. This disclosure is in no way limited by the first azole concentration.

In some embodiments, treating the wastewater using the wastewater treatment system may produce treated water having a second azole concentration of less than about 10 mg/L, for example, less than about 10 mg/L, less than about 9 mg/L, less than about 8 mg/L, less than about 7 mg/L, less than about 6 mg/L, less than about 5 mg/L, less than about 4 mg/L, less than about 3 mg/L, less than about 2 mg/L, or less than about 1 mg/L. The reduced concentration of azoles to less than about 10 mg/L in the treated water may be for the operation of at least one downstream water treatment process, such as a biological water treatment system. The downstream treatment process may be any process used to further treat or polish water, and the invention is not limited by the type of downstream water treatment process. Alternatively, the treated water may be discharged without further treatment.

Figure 1:
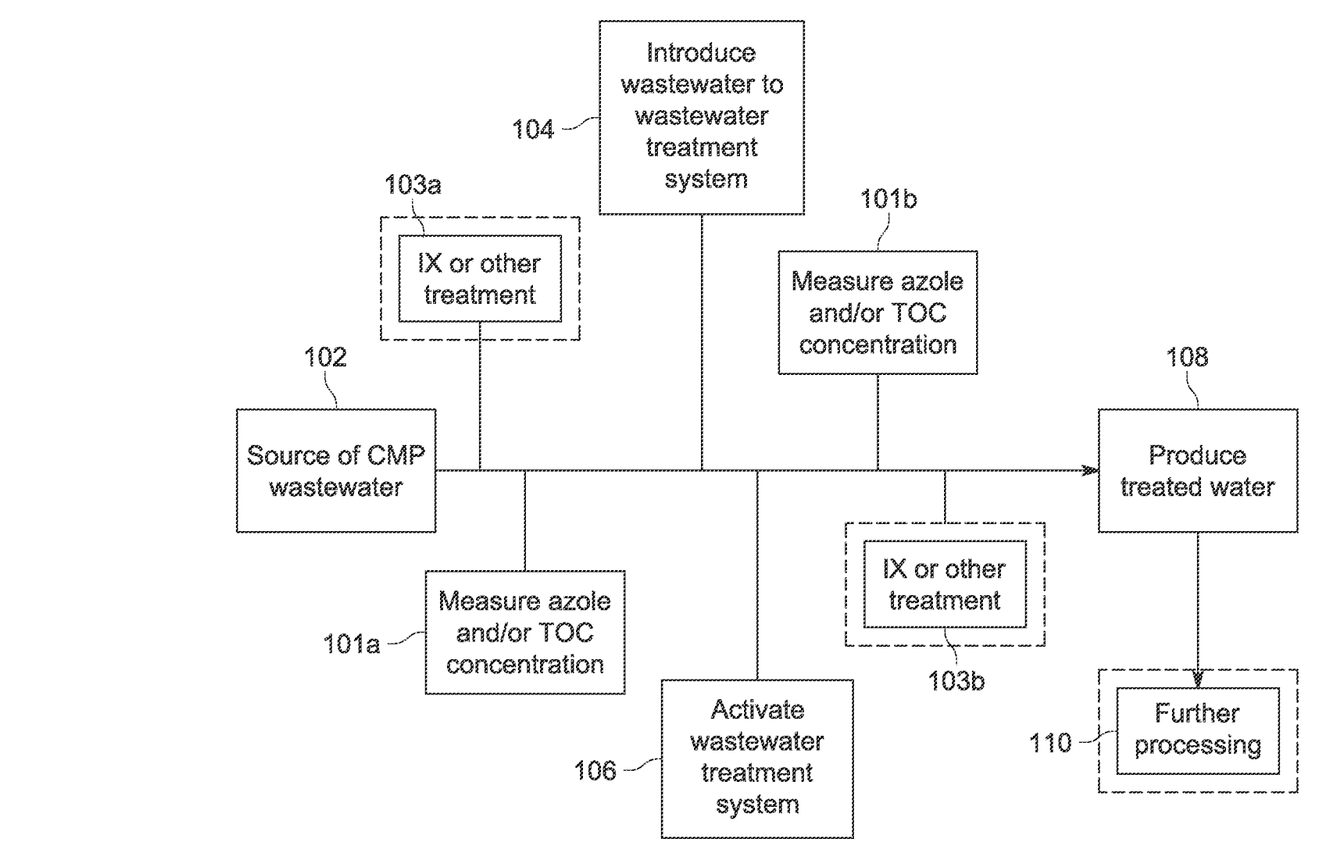
FIG. 1 provides a general schematic of a method of treating CMP wastewater comprising azoles, according to one embodiment.

A general schematic of a method of treating CMP wastewater comprising azoles is illustrated in FIG. 1. With reference to FIG. 1, the method may include step 102 of providing wastewater from a source of wastewater. The wastewater may be introduced into the wastewater treatment system at step 104. Prior to the introduction into the wastewater treatment system, the method may include a step 101*a* of measuring at least one of the azole concentration and TOC concentration of the wastewater. As an optional step, indicated by the dashed line box, the method may include a step 103*a* of treating the wastewater with an additional water treatment process, such as an ion exchange process or a filtration process. Once the wastewater has been introduced into the wastewater treatment system, the method may include a step 106 of activating the wastewater treatment to produce and introduce the free radicals into the wastewater in an amount sufficient to reduce the azole concentration in the wastewater. The free radicals decompose the azoles in the wastewater to produce treated water at step 108. The method may include a step 101*b* of measuring at least one of the azole concentration and TOC concentration of the treated water. The method may include an optional step 103*b* of treating the treated water with an additional water treatment process, such as an ion exchange process or a filtration process. The method may further include an additional step 110 of providing the treated water to a downstream treatment process, such as biological treatment or any other water treatment process known to one skilled in the art.

In some embodiments, the azoles in the CMP wastewater may be a mixture of any number of different azole compounds. For example, the azoles comprising the mixture of azoles may be selected from the group consisting of imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, benzotriazole, o-tolyltriazole, m-tolyltriazole, p-tolyltriazole, 5-ethylbenzotriazole, 5-n-propylbenzotriazole, 5-isobutylbenzotriazole, and 4-methylbenzotriazole, and combinations thereof. In certain embodiments, the azoles comprising the mixture of azoles may be selected from the group consisting of imidazole, pyrazole, oxazole, 2,3-triazole, 1,2,4-triazole, 1,2,5-oxadiazole, benzotriazole, o-tolyltriazole, m-tolyltriazole, p-tolyltriazole, and 5-ethylbenzotriazole. Other azoles may be included as part of the azole mixture, along with other organic and inorganic components, such as abrasives, metals, and surfactants as described herein. In certain embodiments, the mixture of azoles may include at least 1,2,4-triazole.

In some embodiments, the CMP wastewater may include additional organic compounds that contribute to the background TOC. Thus, the TOC concentration of the CMP wastewater may be higher than the concentration of azoles. For example, the TOC concentration of the CMP wastewater may be in excess of 100 mg/L, such as greater than 150 mg/L, greater than 175 mg/L, greater than 200 mg/L, or more. During treatment processes, the reduction in TOC concentration may be used as a proxy for the reduction in total azole concentration. For example, the azole concentration in the CMP wastewater and the TOC concentration may have an approximately linear relationship, that is, as the azole concentration decreases, the TOC concentration decreases. The amount of reagents that are added to the CMP wastewater for treatment may be determined by measurements of the TOC concentration of the wastewater prior to treatment and of parallel measurement made for the treated water.

In some embodiments, the wastewater treatment system used to remove azoles from the CMP wastewater may be an advanced oxidation process (AOP). In particular embodiments, the AOP may be a photochemical AOP, employing photochemical reactions with organic molecules and/or oxidants. For example, ultraviolet (UV) treatment has shown to be effective in the removal of stable organic molecules. UV treatment generally utilizes UV activation of an oxidizing salt for the elimination of various organic species. Any strong oxidant may be used. In some non-limiting embodiments, a persulfate compound may be used. In at least some embodiments, at least one of ammonium persulfate, sodium persulfate, and/or potassium persulfate may be used. In other non-limiting embodiments, a peroxide compound, such as hydrogen peroxide, may be used. The CMP wastewater may be dosed with the oxidant.

The reactions to activate the oxidizing salt with UV radiation may occur in accordance with chemical equations (1) and (2), corresponding to peroxide and persulfate, respectively:

$$H_2O_2 \rightarrow 2HO \cdot \quad (1)$$

$$S_2O_8^{2-} \rightarrow 2SO_4^{\cdot -} \quad (2)$$

In some embodiments, the ratio of persulfate to TOC in the CMP wastewater, that is, the relative amount of persulfate salt dosed to the wastewater prior to treatment, may be from about 10:1 to about 50:1, for example, about 10:1, about 15:1, about 20:1, about 25:1, about 30:1, about 35:1, about 40:1, about 45:1, or about 50:1. In a non-limiting example, a 25:1 and a 50:1 persulfate to TOC ratio may reduce the azole concentration in CMP wastewater to less than about 10 mg/L. In some embodiments, the ratio of peroxide to TOC ratio in the CMP wastewater, may be from about 5:1 to about 25:1, for example, about 5:1, about 10:1, about 15:1, about 20:1, or about 25:1. In another non-limiting example, a 15:1 and a 25:1 peroxide to TOC ratio may reduce the azole concentration in CMP wastewater to less than about 10 mg/L.

In some embodiments, the pH of the CMP wastewater for treatment with an AOP may be acidic, that is, less than 7. For example, the pH of the CMP wastewater may be about 3. The acidic pH can be maintained using any known pH modifier that does not interfere with the water treatment system, such as an acid, for example, sulfuric acid, or an acid salt. Alternatively, the pH of the CMP wastewater may be basic, that is, greater than 7. For example, the pH of the CMP wastewater may be about 9. The basic pH can be maintained using any known pH modifier that does not interfere with the water treatment system, such as a base, including, but not limited to, sodium hydroxide and calcium hydroxide or lime.

In some embodiments, the CMP wastewater dosed with an oxidant may be exposed to a source of UV light. For instance, the methods disclosed herein may include the use of one or more UV lamps, each emitting light at a desired wavelength in the UV range of the electromagnetic spectrum. For instance, according to some embodiments, the UV lamp may have a wavelength ranging from about 180 to about 280 nm, and in some embodiments, may have a wavelength ranging from about 185 nm to about 254 nm. As described herein, exposure of the oxidant to the UV light produces free radicals, such as hydroxyl and persulfate radicals, that can react with the mixture of azoles in the CMP wastewater and decompose them to form treated water.

UV treatments to remove organic compounds such as azoles are known, including the VANOX® AOP system commercially available from Evoqua Water Technologies LLC (Pittsburgh, PA), which may be implemented. Some related patents and patent application publications are hereby incorporated herein by reference in their entireties for all purposes include U.S. Pat. Nos. 8,591,730; 8,652,336; 8,961,798; 10,494,281; US Patent Publication 2018/0273412; and PCT/US2019/051861, all to Evoqua Water Technologies LLC.

In some embodiments, the wastewater treatment system used to remove azoles from the CMP wastewater may be a dissolved iron treatment process, such as wastewater treatment system utilizing Fenton chemistry. The Fenton's reagent used for the removal of azoles may be formed by adding about 500 mg/L to about 3,000 mg/L of an oxidant, such as hydrogen peroxide or a persulfate salt, to about 50 mg/L to about 300 mg/L of a soluble iron compound (e.g., ferrous ($Fe^{2+}$) sulfate). The Fenton's reactions may also decompose at least a portion of any hydrogen peroxide present in the CPM wastewater prior to the addition of a larger quantity of hydrogen peroxide or a persulfate. The Fenton's reaction may occur in accordance with chemical equations (3)-(5):

$$Fe^{2+} + H_2O_2 \rightarrow Fe^{3+} + HO\cdot + OH^- \quad (3)$$

$$Fe^{3+} + H_2O_2 \rightarrow Fe^{2+} + HOO\cdot + H^+ \quad (4)$$

$$Fe^{2+} + S_2O_8^{2-} \rightarrow Fe^{3+} + SO_4\cdot^- + SO_4^{2-} \quad (5)$$

The hydroxyl and persulfate radicals formed from the UV photolysis of hydrogen peroxide and the persulfate salt and the hydroxyl, hydroperoxyl, and persulfate radicals formed by the oxidation of $Fe^{2+}$ or the reduction of $Fe^{3+}$ may react with and decompose the azoles in the CMP wastewater into primarily nitrogen oxides ($NO_2/NO_3$), carbon dioxide and water. Without wishing to be bound by any particular theory, the decomposition of a nitrogenous organic molecule, such as an azole, may occur by the reaction illustrated in equation 6:

$$C_xN_yH_z + OH\cdot \rightarrow CO_2 + NO_3 + H_2O \quad (6)$$

In some embodiments, when a dissolved iron compound is used for treating the wastewater comprising azoles, the method may include introducing the dissolved iron compound and an oxidizer to the wastewater at an acidic pH to produce free radicals to decompose the azoles. The pH may be adjusted or maintained at a pH of about 3, such as between 2 and 5, by the addition of an acid, such as sulfuric acid. The oxidizer introduced into the wastewater may include a peroxide, such as hydrogen peroxide, or a persulfate salt such as ammonium persulfate, potassium persulfate, and sodium persulfate, and the invention is not limited by the type of oxidant added as part of the dissolved iron treatment system. As described herein, peroxides produce hydroxyl and hydroperoxyl radicals and persulfates produce persulfate radicals when reacting with the dissolved iron compounds.

During the decomposition of azoles using a dissolved iron treatment system, a byproduct will be formed which comprises an excess of dissolved iron. In some embodiments, the method may include a step of removing the excess dissolved iron by precipitating iron-containing compounds from the wastewater by increasing the pH of the wastewater. The pH of the wastewater may be adjusted or maintained at a pH of between about 6 and about 10, such as a pH of 9, by the addition of a base, for example sodium hydroxide, calcium hydroxide, or the like. Without wishing to be bound by any particular theory, increasing the pH allows for the formation of insoluble iron compounds, such as iron hydroxides, that can settle in a reaction vessel. The precipitated iron compounds may be removed after settling, leaving behind treated water.

Dissolved iron treatment systems for the removal of organic compounds in wastewater are described in US 2019/0127247 to Evoqua Water Technologies LLC, the disclosure of which is herein incorporated by reference in its entirety for all purposes.

In some embodiments, the wastewater treatment system used to remove azoles from the CMP wastewater may include an electro-oxidation process. The electro-oxidation process may comprise an electrochemical cell used to decompose azoles in the CMP wastewater. The electrochemical cell may generally include two electrodes, that is, a cathode and an anode. A reference electrode may also be used, for example, in proximity to the anode.

In some embodiments, the cathode may be constructed of various materials. In some non-limiting embodiments, the cathode may be made of stainless steel, copper, cobalt, nickel alloy, titanium, or a DSA material. DSA materials may be uncoated or may be coated with noble metals or metal oxides, such as Pt or $IrO_2$, among others.

In some embodiments, the anode may be constructed of a material characterized by a high oxygen evolution overpotential. In some embodiments, the anode may be constructed from boron doped diamond (BDD), a Magnéli phase titanium oxide of the general formula $Ti_nO_{2n-1}$, where n=4-10 inclusive, or a porous material such as activated carbon in a suitable binding matrix, such as polytetrafluoroethylene (PTFE).

In operation, a CMP wastewater stream containing azoles may be introduced to an electrochemical cell for treatment. The electrochemical cell includes an oxidant for the production of radicals at the electrode surfaces, such as a persulfate salt or hydrogen peroxide as described herein. A voltage may be applied to either the anode or the cathode to produce radical species to react with the azoles and produce treated water. As described herein, the treated water may be directed to a further treatment system such as ion exchange, sent to a point of use, or otherwise discharged.

Electrochemical cells for the decomposition of organic molecules in wastewater are described in WO 2020/041712, PCT/US2020/012648, and PCT/US2020/038029, all to Evoqua Water Technologies LLC, the disclosures of which are herein incorporated by reference in their entirety for all purposes.

For any of the wastewater treatment systems described herein, the amount of reagents to be combined with the CMP wastewater may be dependent on the properties of the wastewater, such as the wastewater temperature, total concentration of the azoles, the background TOC concentration, and the pH of the wastewater. The amount of reagents may further be dependent on the physical properties of the wastewater treatment system, such as an inlet and/or outlet flow rates between wastewater treatment system components and the requirements for water discharge out of the system. In some embodiments of the method of treating water, the concentration of azoles, the TOC concentration, the flow rate, and optionally the pH of the wastewater may be measured prior to introduction into the wastewater treatment system. The concentration of azoles, the TOC concentration, the flow rate, and the pH of the wastewater may be measured by suitably constructed and arranged sensors or meters positioned upstream of the wastewater treatment system. The signals generated by the sensors may be sent to a controller or other system component that is configured to regulate the addition of the reagents to the CMP wastewater.

In some embodiments of the method of treating water, the concentration of azoles and/or the TOC concentration of the treated water may be measured. As with measurements upstream of the wastewater treatment system, the concentration of azoles and/or the TOC concentration may be measured by suitably constructed and arranged sensors positioned downstream of the wastewater treatment system. The second set of azole concentration and/or TOC concentration sensors may be used to determine if the treated water has been sufficiently treated and is ready for discharge or if the treated water requires further treatment, such as further treatment by the addition of more radical-producing reagents as described herein or in one or more additional wastewater treatment systems as described herein or any other water treatment system known to one of skill in the art.

In some embodiments, the method of treating water may include treating the wastewater or treated water using additional treatment systems. For example, the wastewater and/or the treated water may be treated using an ion exchange system to remove metal ions. As described herein, CMP wastewater generally includes copper and may contain other metal ions associated with semiconductor processing, such as boron, phosphorus, or arsenic. Metal ions should be removed prior to discharging the water. Treatments to remove metal can occur either before treating the wastewater using the wastewater treatment system or after producing treated water. In some embodiments, the wastewater and/or the treated water may be treated using a filtration system. For example, the CMP wastewater may be treated using a filtration system prior to introduction into an AOP system, such as a UV-persulfate AOP or a UV-peroxide AOP. Without wishing to be bound by any particular theory, the transmittance of broad-spectrum UV light through water may depend on the optical properties of the water, and the transmittance may be reduced if the wastewater is cloudy or turbid. Treatment of the wastewater with a filtration system, such as microfiltration or ultrafiltration, prior to treatment with the wastewater system may improve the clarity of the wastewater and thus the effectiveness of the UV-AOP wastewater treatment system. Alternatively, the wastewater may be treated using a filtration system after treatment to remove any solids produced during a treatment process, such as precipitated iron compounds from a dissolved iron treatment process or any other treatment process used to treat the wastewater. One of skill in the art can appreciate that any additional treatment systems for treating the wastewater and/or treated water can be placed at any necessary location in a system to result in the desired water quality or overall system performance.

In accordance with another aspect, there is provided a method of facilitating treatment of CMP wastewater comprising azoles. The method of facilitating may comprise providing a wastewater treatment system having a connection to a source of wastewater having a first azole concentration. The first azole concentration may be from about 20 mg/L to about 200 mg/L as described herein. The wastewater treatment system may be constructed and arranged to produce and introduce free radicals into the wastewater. The method may further comprise providing a controller configured to regulate at least the introduction of wastewater into the treatment system and the production of free radicals responsive to at least the concentration of azoles in the wastewater to produce a treated water having a second azole concentration less than the first azole concentration. The second azole concentration may be less than about 10 mg/L as described herein.

In some embodiments of the method of facilitating, the method may further comprise providing at least one additional treatment system for the wastewater. In some cases, the at least one additional treatment system may include at least one of an ion exchange system and an ultrafiltration system. In some embodiments of the method of facilitating, the method may further comprise providing a first azole concentration sensor constructed and arranged to measure the azole concentration prior to introduction into the treatment system. In some embodiments of the method of facilitating, the method may further comprise providing a first TOC concentration sensor constructed and arranged to measure a TOC concentration prior to introduction into the treatment system. In some embodiments, of the method of facilitating, the method may further comprise providing a flow meter constructed and arranged to measure the flow of wastewater into the wastewater treatment system.

In some embodiments of the method of facilitating, providing the treatment system may include providing at least one of an AOP and a dissolved iron treatment process. The AOP may be an AOP as described herein and the dissolved iron treatment process may be the dissolved iron treatment process as described herein. In some embodiments, the AOP may be a UV-AOP, such as a UV-persulfate AOP or a UV-peroxide AOP. When the AOP is a UV-persulfate AOP, the method of facilitating may further comprise providing the persulfate. When the AOP is a UV-peroxide AOP, the method of facilitating may further comprise providing the peroxide. When a dissolved iron treatment system is provided, the method of facilitating may further include providing at least one of a soluble iron compound, an oxidizer as described herein, and a pH adjuster.

In some embodiments of the method of facilitating, the method may further comprise providing a second azole concentration sensor configured to measure the azole concentration of the treated water. In some embodiments of the method of facilitating, the method may further comprise a second TOC concentration sensor configured to measure the TOC concentration of the treated water.

The azole concentration in the treated water may be sufficient for the operation of at least one downstream water treatment process, and in further embodiments of the method of facilitating, the method may comprise providing the downstream water treatment process. The downstream water treatment process may include a biological treatment process, or any other wastewater treatment process known in the art.

In some embodiments of the method of facilitating, the method may further include instructing a user to connect the wastewater treatment system to the source of wastewater. In some embodiments of the method of facilitating, the method may further include instructing the user to activate the wastewater treatment system to produce and introduce the free radicals into the wastewater in an amount sufficient to reduce the azole concentration in the wastewater and produce the treated water.

EXAMPLES

The function and advantages of these and other embodiments can be better understood from the following examples. These examples are intended to be illustrative in nature and are not considered to be in any way limiting the scope of the invention.

Example 1—Removal of Azoles from CMP Wastewater Using a UV-Persulfate AOP

Wastewater with a TOC concentration of about 100 mg/L and a pH of 3 was treated using various ratios of persulfate to TOC. The TOC concentration of the wastewater included both background TOC concentration and a spiked aliquot of a mixture of azoles comprising at least 1,2,4-triazole at a concentration of about 60 mg/L. Prior to the spike with the mixture of azoles, the TOC concentration of the CMP wastewater was about 50 mg/L. The CMP wastewater included further included copper, hydrogen peroxide, and other inorganic and organic molecules. The first step was to pre-treat the wastewater using an ultrafiltration system to remove particulates and enhance the transmissivity of UV radiation. Sodium persulfate was added to the spiked wastewater in amount of 10:1, 25:1, and 50:1 persulfate to TOC ratios. The dosed wastewater was directed into the inlet of a UV reactor and the lamps energized to activate the persulfate ions in the wastewater to form persulfate radicals to react with the azoles and other organic molecules present. The wastewater was treated in the UV reactor for up to 140 minutes, with TOC concentrations measured every 15 minutes.

The decomposition of the azoles and other organic molecules started rapidly for each of the 10:1, 25:1, and 50:1 persulfate to TOC ratios. The 10:1 persulfate to TOC treatment proceeded the slowest, and at the end of the 140-minute run period, the TOC concentration had been reduced to about 75 mg/L. The 25:1 and 50:1 persulfate to TOC treatments proceeded at approximately the same rate, with a sharp decrease of the TOC concentration to about 10 mg/L after about 45 minutes of run time. By the end the 140-minute run period, the TOC concentration was approximately the same as the sample collected at 45 minutes of run time. The total azole concentration closely followed the expected trend in the removal of TOC from the wastewater, with the concentration of azoles being reduced in the 25:1 persulfate to TOC samples to less than about 10 mg/L. To complete the treatment of the CMP wastewater, the treated water was directed to an ion exchange treatment process to remove the copper ions present in the treated water.

As is seen in the data above, the use of UV-persulfate AOP to remove azoles was overall successful. The concentration of azoles was reduced to less than 10 mg/L and the reduction in azole concentration, measured as the 1,2,4-triazole concentration, showed a positive correlation with the reduction in overall TOC concentration.

Example 2—Removal of Azoles from CMP Wastewater with Low Background TOC Using a UV-Peroxide AOP Wastewater with a TOC concentration of about 100 mg/L and a pH of 3 was treated using a peroxide-based UV AOP. The TOC concentration of the wastewater included both background TOC concentration and a spiked aliquot of a mixture of azoles comprising at least 1,2,4-triazole at a concentration of about 60 mg/L. Prior to the spike with the mixture of azoles, the TOC concentration of the CMP wastewater was about 5 mg/L. The CMP wastewater further included copper, other inorganic and organic molecules, and hydrogen peroxide. The first step was to pre-treat the wastewater using an ultrafiltration system to remove particulates and enhance the transmissivity of UV radiation. The filtered wastewater was directed into the inlet of a UV reactor. The UV lamps were energized to produce hydroxyl radicals from the initial hydrogen peroxide present to react with the azoles and other organic molecules present. The wastewater was treated in the UV reactor for up to 140 minutes, with TOC concentrations measured every 15 minutes.

After the first 15 minutes of run time, the CMP wastewater was then dosed with about 1,500 mg/L of hydrogen peroxide. After the bolus of hydrogen peroxide was added, the decomposition of the azoles and other organic molecules started rapidly and plateaued after 60 minutes of run time, with a measured TOC concentration of about 20 mg/L at the 60-minute time mark. The reaction was allowed to complete the 140-minute run time, and the TOC concentration after the complete run was measured to be about 10 mg/L. The azole concentration, measured as the concentration of 1,2,4-triazole, at the end of the experiment was reduced to about 7 mg/L. The hydrogen peroxide concentration correlated linearly with the TOC concentration and was nearly consumed at the 60-minute run time. To complete the treatment of the CMP wastewater, the treated water was directed to an ion exchange treatment process to remove the copper ions present in the treated water.

As is seen in the data above, the use of UV-peroxide AOP to remove azoles from the CMP wastewater having low background TOC was overall successful. The concentration of azoles was reduced to less than about 10 mg/L and the reduction in azole concentration, measured as the 1,2,4-triazole concentration, showed a positive correlation with the reduction in overall TOC concentration.

Example 3—Removal of Azoles from CMP Wastewater with High Background TOC Using a UV-Peroxide AOP Wastewater with a TOC concentration of about 200 mg/L and a pH of 3 was treated using a peroxide-based UV AOP. The CMP wastewater TOC concentration included both a high background TOC concentration of about 100 mg/L and a spiked aliquot of a mixture of about 100 mg/L of azoles comprising at least 1,2,4-triazole. The CMP wastewater further included copper, other inorganic and organic molecules, and hydrogen peroxide. The first step was to pre-treat the wastewater using an ultrafiltration system to remove particulates and enhance the transmissivity of UV radiation. The filtered wastewater was directed into the inlet of a UV reactor. The UV lamps were energized to produce hydroxyl radicals from the initial hydrogen peroxide present to react with the azoles and other organic molecules present. The wastewater was treated in the UV reactor for up to 140 minutes, with TOC concentrations measured every 15 minutes.

After the first 15 minutes of run time, the CMP wastewater was then dosed with about 3,000 mg/L of hydrogen peroxide. After the bolus of hydrogen peroxide was added, the decomposition of the azoles and other organic molecules started slowly and continued at a relative steady rate. The reaction plateaued after 90 minutes of run time with a measured TOC concentration of about 20 mg/L and an azole concentration, measured as the concentration of 1,2,4-triazole, of about 3 mg/L. At this time point, an additional bolus of about 1,000 mg/L hydrogen peroxide was added. The additional hydrogen peroxide decreased the TOC concentration to about 10 mg/L and the azole concentration to less than 1 mg/L at the conclusion of the 140-minute run time. The hydrogen peroxide concentration and azole concentration correlated linearly with the TOC concentration and was nearly consumed at the 90-minute run time and again at the 140-minute run time for the additional bolus of hydrogen peroxide. To complete the treatment of the CMP wastewater, the treated water was directed to an ion exchange treatment process to remove the copper ions present in the treated water.

As is seen in the data above, the use of UV-peroxide AOP to remove azoles from the CMP wastewater was overall successful. The amount of peroxide that was needed to reduce the TOC and azole concentrations had the expected correlation with the initial TOC and azole concentrations in the CMP wastewater. The concentration of azoles was reduced to less than 1 mg/L and the reduction in azole concentration showed a positive correlation with the reduction in overall TOC concentration.

Example 4—Removal of Azoles from CMP Wastewater with High Background TOC and High pH Using a UV-Peroxide AOP Wastewater with a TOC concentration in excess of about 200 mg/L and a pH of 8 was treated using a peroxide-based UV AOP. The CMP wastewater TOC concentration included both a high background TOC concentration in excess of about 100 mg/L and a spiked aliquot of a mixture of about 100 mg/L of azoles comprising at least 1,2,4-triazole at a concentration of about 60 mg/L. The CMP wastewater further included copper, other inorganic and organic molecules, and hydrogen peroxide. The first step was to pre-treat the wastewater using an ultrafiltration system to remove particulates and enhance the transmissivity of UV radiation. The filtered wastewater was directed into the inlet of a UV reactor. The UV lamps were energized to produce hydroxyl radicals from the initial hydrogen peroxide present to react with the azoles and other organic molecules present. The wastewater was treated in the UV reactor for up to 140 minutes, with TOC concentrations measured every 15 minutes. The pH was maintained at 8 during the course of treatment by the addition of sodium hydroxide at every TOC measurement period.

After the first 15 minutes of run time, the CMP wastewater was then dosed with about 3,000 mg/L of hydrogen peroxide. After the bolus of hydrogen peroxide was added, the decomposition of the azoles and other organic molecules started slowly and did not change in rate. At the 90-minute run time mark, an additional bolus of about 1,000 mg/L hydrogen peroxide was added, with the measured TOC concentration having a value of about 75 mg/L. The additional hydrogen peroxide decreased the TOC concentration to about 60 mg/L at the conclusion of the 140-minute run time. The hydrogen peroxide concentration correlated approximately linearly with the TOC concentration but was consumed faster than the TOC was reduced. After the 140-minute run time, the remaining concentration of hydrogen peroxide was about 500 mg/L. To complete the treatment of the CMP wastewater, the treated water was directed to an ion exchange treatment process to remove the copper ions present in the treated water and through an additional treatment step to remove the excess hydrogen peroxide.

As is seen in the data above, the use of UV-peroxide AOP to remove azoles from the CMP wastewater at a high pH was partially successful. The amount of peroxide that was needed to reduce the TOC and azole concentrations had the expected correlation with the initial TOC and azole concentrations in the CMP wastewater. The TOC concentration was reduced to less than 60 mg/L, and as the TOC and azole concentrations are approximately correlated, it is expected that the total azole concentration was also reduced even with the high background pH potentially interfering with the production of radicals from the hydrogen peroxide.

Example 5—Removal of Azoles from CMP Wastewater Using Fenton's Reagent

CMP wastewater with a TOC concentration of about 110 mg/L and a pH of 3 was treated. The TOC concentration of the wastewater included both background TOC concentration and a spiked aliquot of a mixture of azoles comprising at least 1,2,4-triazole of about 60 mg/L. Prior to the spike with the mixture of azoles, the TOC concentration of the CMP wastewater was about 50 mg/L. The CMP wastewater further included copper and other inorganic and organic molecules. Ferrous sulfate and hydrogen peroxide at concentration of 1000 mg/L were added to the CMP wastewater to provide a peroxide to TOC ratio of about 10:1. Ferrous iron in the form of ferrous sulfate was added to the CMP wastewater at concentrations of about 10 mg/L and about 100 mg/L.

At a dissolved ferrous iron concentration of 10 mg/L, the decomposition reactions started slowly and plateaued after about 30 minutes. At the end of six hours of run time, the TOC had been reduced to approximately 90 mg/L, with the concentration of 1,2,4-triazole reduced from about 60 mg/L to about 50 mg/L and the peroxide concentration reduced to less than about 500 mg/L.

At a dissolved ferrous iron concentration of 100 mg/L, the decomposition reactions started slowly and then continued at a relatively steady rate for approximately six hours. At the end of six hours of run time, the TOC had been reduced to approximately 60 mg/L with the concentration of 1,2,4-triazole reduced from about 60 mg/L to 0 mg/L and the peroxide concentration had been reduced to about less than 300 mg/L. To complete both of the 10 mg/L and 100 mg/L reactions, the pH was raised to about 9 using sodium hydroxide or calcium hydroxide to cause precipitation of ferric hydroxide and decompose any remaining hydrogen peroxide.

As is seen in the data above, the use of Fenton's reagent to remove azoles from the CMP wastewater was overall successful. The amount of both ferrous iron and peroxide that were needed to reduce the TOC and azole concentrations had the expected correlation with the initial TOC and azole concentrations in the CMP wastewater. As expected, the azole removal using a lower concentration of ferrous was less effective due to the insufficient production of radical species. At the higher dose of ferrous iron, the concentration of azoles, measured as the concentration of 1,2,4-triazole, was reduced to 0 mg/L and the reduction in azole concentration showed a positive correlation with the reduction in overall TOC concentration.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only. Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of treating chemical-mechanical polishing (CMP) wastewater comprising azoles, the method comprising:
providing the wastewater having a first azole concentration;
introducing the wastewater to an inlet of a wastewater treatment system, the wastewater treatment system constructed and arranged to produce and introduce free radicals into the wastewater; and
activating the wastewater treatment system to produce and introduce the free radicals into the wastewater in an amount sufficient to reduce the azole concentration in the wastewater and produce treated water having a second azole concentration, the second azole concentration less than the first azole concentration, an amount of free radical precursor introduced into the wastewater treatment system determined by at least the first azole concentration and the second azole concentration.

2. The method of claim 1, wherein the first azole concentration is from about 20 mg/L to about 200 mg/L.

3. The method of claim 2, wherein the first azole concentration is from about 40 mg/L to about 150 mg/L.

4. The method of claim 3, wherein the first azole concentration is from about 80 mg/L to about 100 mg/L.

5. The method of claim 1, wherein the second azole concentration is less than about 10 mg/L.

6. The method of claim 1, wherein the azole concentration in the treated water is sufficient for the operation of at least one downstream water treatment process.

7. The method of claim 1, wherein providing the wastewater comprises providing wastewater having a mixture of azoles.

8. The method of claim 7, wherein providing the wastewater with a mixture of azoles comprises providing wastewater with a mixture of azoles selected from the group consisting of imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, 1,2,3,4-thiatriazole, benzotriazole, o-tolyltriazole, m-tolyltriazole, p-tolyltriazole, 5-ethylbenzotriazole, 5-n-propylbenzotriazole, 5-isobutylbenzotriazole, and 4-methylbenzotriazole.

9. The method of claim 7, wherein providing the wastewater with a mixture of azoles comprises providing wastewater with a mixture of azoles selected from the group consisting of imidazole, pyrazole, oxazole, 2,3-triazole, 1,2,4-triazole, 1,2,5-oxadiazole, benzotriazole, o-tolyltriazole, m-tolyltriazole, p-tolyltriazole, and 5-ethylbenzotriazole.

10. The method of claim 9, wherein providing the wastewater with a mixture of azoles comprises providing wastewater including at least 1,2,4-triazole.

11. The method of claim 1, further comprising treating at least one of the wastewater and treated water using an ion exchange treatment system.

12. The method of claim 1, further comprising measuring the azole concentration in the wastewater prior to introducing the wastewater to the inlet of the wastewater treatment system.

13. The method of claim 1, further comprising measuring a total organic carbon (TOC) concentration in the wastewater prior to introducing the wastewater to the inlet of the wastewater treatment system.

14. The method of claim 1, wherein introducing the wastewater to the inlet of the wastewater treatment system comprises introducing the wastewater to an inlet of a wastewater treatment system selected from at least one of an advanced oxidation process (AOP) and a dissolved iron treatment process.

15. The method of claim 14, wherein introducing the wastewater to the inlet of the AOP comprises introducing the wastewater to the inlet of an ultraviolet (UV)-AOP.

16. The method of claim 15, further comprising treating the wastewater with a filtration system prior to introduction into the UV-AOP.

17. The method of claim 16, wherein introducing the wastewater to the inlet of the ultraviolet (UV)-AOP comprises introducing the wastewater to the inlet of a UV-persulfate AOP.

18. The method of claim 17, wherein introducing the wastewater to the inlet of the UV-persulfate AOP comprises introducing persulfate ions to the wastewater.

19. The method of claim 18, wherein activating the UV-persulfate AOP comprises exposing the persulfate ions in the wastewater to UV light to produce persulfate radicals.

20. The method of claim 16, wherein introducing the wastewater to the inlet of the ultraviolet (UV)-AOP comprises introducing the wastewater to the inlet of a UV-peroxide AOP.

21. The method of claim 20, wherein introducing the wastewater to the inlet of the UV-peroxide AOP comprises introducing a peroxide to the wastewater.

22. The method of claim 21, wherein activating the UV-peroxide AOP comprises exposing the peroxide ions in the wastewater to UV light to produce hydroxyl or hydroperoxyl radicals.

23. The method of claim 14, wherein introducing the wastewater to the inlet of the wastewater treatment system comprises introducing the wastewater to the inlet of a dissolved iron treatment process.

24. The method of claim 23, further comprising reducing the pH of the wastewater prior to introducing the wastewater to the dissolved iron treatment process.

25. The method of claim 24, wherein introducing the wastewater to an inlet of a dissolved iron treatment process comprises introducing a dissolved iron compound and an oxidizer to the wastewater at an acidic pH.

26. The method of claim 25, wherein introducing the wastewater to an inlet of a dissolved iron treatment process comprises introducing a dissolved iron compound and persulfate ions to the wastewater at an acidic pH to produce persulfate radicals.

27. The method of claim 25, wherein introducing the wastewater to an inlet of a dissolved iron treatment process comprises introducing a dissolved iron compound and a peroxide to the wastewater at an acidic pH to produce hydroxyl and/or hydroperoxyl radicals.

* * * * *